Aug. 13, 1963   M. SPECTOR   3,100,327
ADJUSTABLE CLAMP
Filed Sept. 12, 1960
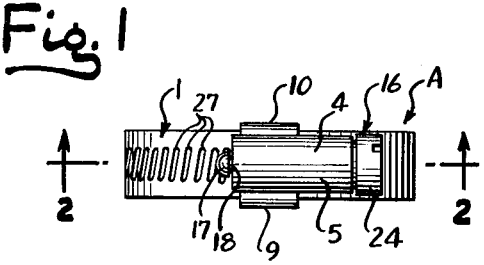
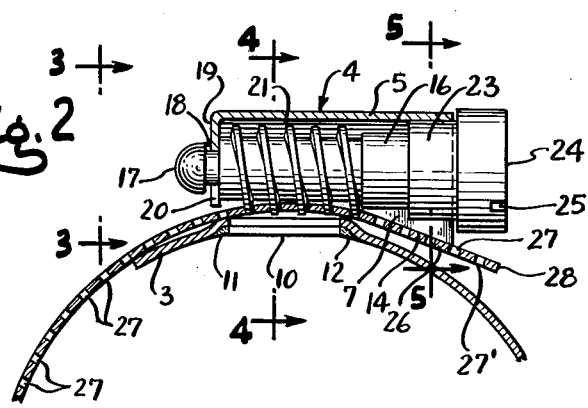
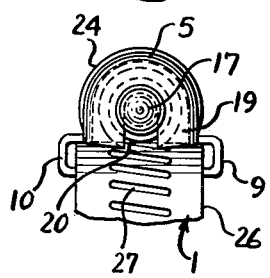 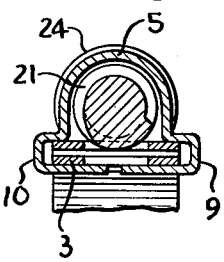 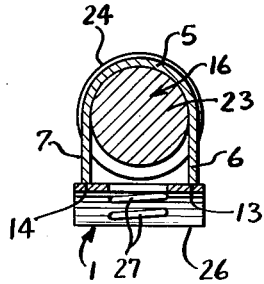
INVENTOR.
MORRIS SPECTOR United States Patent Office 3,100,327
Patented Aug. 13, 1963

3,100,327
ADJUSTABLE CLAMP
Morris Spector, Highland Park, Ill., assignor to Sterling Automotive Manufacturing Co., Elk Grove Village, Ill., a corporation of Illinois
Filed Sept. 12, 1960, Ser. No. 55,382
2 Claims. (Cl. 24—274)

This invention relates to improvements in adjustable clamps.

It is a primary object of the present invention to provide an improved adjustable clamp of the type used to secure a hose or other flexible tubing to a pipe or similar fitting.

It is also an object of the present invention to provide an adjustable clamp of the type stated which can be used with a wide range of sizes of hose or flexible tubing.

The adjustable clamp of the present invention is of the type which includes a transversely flat clamping band having a housing with a take-up screw therein located at one end of the band. The other end of the band is slotted over a portion of its length and projects through the housing in overlapping relation to said one end of the band. The take-up screw draws the slotted end through the housing to tighten the clamp around the hose or tubing. The housing is constructed so as to prevent interference of the leading edge of the slotted end of the band with the head of the screw as the slotted end of the band is drawn through the housing.

It is a still further object of the present invention to provide a clamp of the above mentioned character wherein the screw can be irremovably mounted in the housing in a simple manner after the housing has been secured to the band, whereby the screw does not interfere with the operations of securing the housing to the band.

It is another object of the present invention to provide an adjustable clamp of the type stated in which the take-up screw has an annular groove cooperating with one end of the housing for limiting the axial shifting of the screw in both directions and for absorbing the axial thrust of the screw, thereby simplifying the construction of the housing and assembly of the take-up screw therewith.

The attainment of the above and further objects of the present invention will be apparent from the following specification taken in conjunction with the accompanying drawing forming a part thereof.

In the drawing:

FIG. 1 is a top plan view of an adjustable clamp constructed in accordance with and embodying the present invention;

FIG. 2 is a fragmentary sectional view taken along line 2—2 of FIG. 1; and

FIGS. 3, 4, and 5 are fragmentary sectional views taken along lines 3—3, 4—4 and 5—5, respectively, of FIG. 2.

Like reference numerals designate like parts throughout the drawings.

Referring now in more detail to the drawing which illustrates a preferred embodiment of the present invention, A designates an adjustable clamp comprising a continuous narrow arcuate, transversely flat band 1 of spring steel or the like which is adapted to encircle a hose or other flexible tubing (not shown). Secured to the band 1 adjacent to an end 3 thereof is a hollow sheet metal housing 4 which has a substantially semi-cylindrical top 5 and spaced substantially parallel depending sides 6, 7, the latter terminating adjacent to the forward end of the housing in U-shaped mounting members 9, 10. The mounting members 9, 10 embrace the longitudinal margins of the band 1 and are permanently secured to the inside of the band 1 as, for example, by welds 11, 12. Rearwardly of the mounting members 9, 10 the sides 6, 7 terminate in inclined parallel edges 13, 14 for purposes presently more fully appearing.

Rotatably mounted in the housing is an adjusting or take-up worm screw 16, the longitudinal axis of which extends in a direction generally longitudinally of the band 1. The tip 17 of the screw 16 is approximately semi-spherical in shape and adjacent to the tip 17 the screw 16 is formed with a diametrally reduced annular groove 18. The housing 4 includes an end wall 19 formed with a slot 20 into which the screw fits with the end wall 19 at the slot lying within the groove 18. Thus the end wall 19 takes the axial thrust of the screw 16 in both directions.

The screw also has a shank provided with a spiral thread 21 which lies within the housing 4, and the screw also includes a cylindrical collar 23 which is adapted to bear against the inside of the top 5. An enlarged cylindrical screw head 24 lies adjacent to the collar 23 and exteriorly of the housing and has a screwdriver slot 25. The head 24 is of a diameter slightly larger than the exterior diameter of the top 5.

The opposite end 26 of the band 1 is formed with a plurality of uniformly spaced parallel slots 27 which extend transversely of the band and are inclined to the longitudinal center line of the band to constitute worm grooves. These slots 27 extend over a portion of the length of the band 1. The sides 6, 7 of the housing 4 are spaced from the band 1 at the end 3 thereof a distance sufficient to provide clearance for insertion of the band end 26 into the housing in overlapping relation to the end 3, as shown in FIG. 2, after the band 1 has been placed around the tube or hose with which it is being used. When the end 26 is inserted into the housing, the screw 16 may be rotated in one direction causing the spiral thread 21 to project into the slots 27. Continued rotation of the screw 16 will draw the end 26 through the housing (i.e. to the right, FIG. 2) to decrease the diametral size of the band 1, thereby tightening the clamp around the hose or tubing. It will be apparent that reverse rotation of the screw 16 will shift the end 26 to the left (FIG. 2) until the endmost slot 27' clears the thread 21, whereupon the ends 3, 26 may be spread apart to permit removal of the clamp A from the hose upon which it was mounted.

Since the band 1 is made of spring steel there is a tendency for the end 26 of the band to flex in a direction toward the collar 23 and head 24 of the screw with the result that the leading edge 28 of the band end 3 has a tendency to jam against the head 24 or collar 23. However, as the end 26 is drawn through the housing it will bear against the edges 13, 14 which are inclined to the longitudinal axis of the screw, so that the edge 28 will be guided away from the screw head 24 and collar 23, thus preventing the edge 28 from binding or jamming against either the collar 23 or head 24.

In the manufacture of the clamp A, the housing 4 is formed substantially to the shape illustrated and is welded in place at the band end 3. Thereafter, the screw 16 is inserted axially into the housing to force the tip 17 through the slot 20. The width of the slot is such that the end wall 19 in the region of the slot 20 will flare outwardly within elastic limits to allow the tip 17 to pass through the slot 20 but will return substantially to its original shape and seat within the groove 18. If the end wall 19 should accidentally become distorted as a result of this operation, it can be easily worked to shape it properly.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and desired to be secured by Letters Patent is:

1. An adjustable hose clamp comprising a band having a plurality of longitudinally spaced slots adjacent to one end thereof, an integral housing mounted on the band adjacent to the other end thereof having a body substantially longitudinally aligned with the longitudinal axis of the end of the band to which the housing is mounted, said housing having also an entirely open end and an opposite distendable end wall extending transversely to the longitudinal axis of the body and having a screw tip receiving opening therein, and a screw in the housing having a head, a threaded shank in the housing and a screw tip opposite said head mounted for rotation in the walled end of the housing, said screw tip having a pair of shoulders defining an annular groove, said housing also having an open bottom including a first bottom part open in a direction radially toward the band and between the end of the housing adjacent to the screw head and the place of securement of the housing to the band and a second bottom part open in a direction radially toward the band between the walled end thereof and the place of securement of the housing to the band, said screw being insertable in the housing after mounting of said housing to said band by insertion of the tip end of the screw through the open end of the housing and axial movement of the screw within the housing to cause the tip of the screw to distend said distendable end wall of the housing within elastic limits and thereby increase the width of the opening in said distendable end wall an amount sufficient to permit the tip of the screw to pass through said distendable end wall of the housing and thereafter allow said distendable end wall to contact to substantially its initial position and lie within said annular groove defined by said pair of shoulders formed in the tip of the screw to prevent retraction of the screw from the housing, said walled end being the only support for the screw in the housing, said screw head being outward of said housing adjacent the open end of the housing, said walled end and the shoulder of said groove, located in the housing, cooperating with the screw head and open end of said housing to limit axial thrust of said screw in said housing during rotation of said screw thereby to distribute said thrust to said housing, and said housing being sized to receive said slotted end of the band and to permit said slotted end to project through said housing in overlapped relation with said other end of said band and with threads on said shank projecting into said slots.

2. The clamp of claim 1 wherein the first bottom part has spaced downwardly depending integral sides formed adjacent the screw head end of the housing and spaced from said screw, each side terminating in an edge positioned below said screw and presented toward said overlapping one end and lying substantially in a plane which is at an acute angle to the longitudinal axis of the screw, said plane lying between the screw head and the band, and the edges constituting a guide for said one end of the band to enable said one end to pass between the screw head and part of the band overlapped by said one end and exteriorally of the housing in the region of said first bottom part to thereby clear said screw head as the screw is rotated to draw said one end past the screw head.

References Cited in the file of this patent
UNITED STATES PATENTS

| | | |
|---|---|---|
| 2,384,094 | Jamie | Sept. 4, 1945 |
| 2,730,782 | Ludwinski | Jan. 17, 1956 |
| 2,828,524 | Cheney | Apr. 1, 1958 |
| 2,894,771 | Putnam | July 14, 1959 |
| 2,940,150 | Rizzo | June 14, 1960 |
| 2,944,314 | Black | July 12, 1960 |

FOREIGN PATENTS

| | | |
|---|---|---|
| 293,279 | Great Britain | July 5, 1928 |
| 662,196 | Great Britain | Dec. 5, 1951 |